US006318824B1

(12) United States Patent
LaGrotta et al.

(10) Patent No.: US 6,318,824 B1
(45) Date of Patent: Nov. 20, 2001

(54) HINGED TRACKING SYSTEM

(75) Inventors: Richard Thomas LaGrotta, Livingston; Manuel G. Orellana, Long Valley, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/181,868

(22) Filed: Oct. 29, 1998

(51) Int. Cl.[7] ................................................. A47B 88/00
(52) U.S. Cl. .......................................... 312/322; 312/323
(58) Field of Search .................................... 312/322, 323, 312/330.1, 334.1, 334.7, 334.11, 334.17, 334.8, 302, 326, 327, 328, 329, 139.1

(56) References Cited

U.S. PATENT DOCUMENTS

| 2,739,024 | * | 3/1956 | Elman ............................... 312/302 X |
| 3,966,273 | * | 6/1976 | Hagen et al. ................ 312/334.17 X |
| 4,516,813 | * | 5/1985 | Sekerich ................................ 312/323 |
| 4,709,972 | * | 12/1987 | LaBudde et al. ................. 312/323 X |
| 4,945,972 | * | 8/1990 | Takeuchi ........................... 312/322 X |
| 4,974,912 | * | 12/1990 | Rask et al. ........................ 312/322 X |
| 5,169,221 | * | 12/1992 | Wheller ................................ 312/323 |
| 5,775,786 | * | 7/1998 | Liebertz ............................ 312/334.8 |

FOREIGN PATENT DOCUMENTS

| 1075079 | * | 10/1954 | (FR) ...................................... 312/322 |
| 2469149 | * | 5/1981 | (FR) ...................................... 312/322 |
| 16749 | * | of 1913 | (GB) ..................................... 312/322 |
| 546905 | * | 8/1942 | (GB) ..................................... 312/322 |

* cited by examiner

*Primary Examiner*—Peter M. Cuomo
*Assistant Examiner*—James O. Hansen

(57) ABSTRACT

A cabinet includes a hinged tracking system for attaching a door to the cabinet. The hinged tracking system allows the door to translate rectilinearly away from the cabinet, as well as rotate with respect to the cabinet. The hinged tracking system includes a track member attached to a side wall of the cabinet, and a slide member slidable with respect to the track member. An intermediate member may be disposed between the track member and the slide member to increase the linear travel of the slide member. A hinge is located between the slide member and the door. The track member and the slide member may include stoppers which prevent overtravel of the slide member with respect to the track member, so that the slide member does not inadvertently slide completely off of the track member. The slide member may also include a locking system for locking the slide member in a maximum extended position, and for locking the hinge in a closed position or an open position.

23 Claims, 6 Drawing Sheets

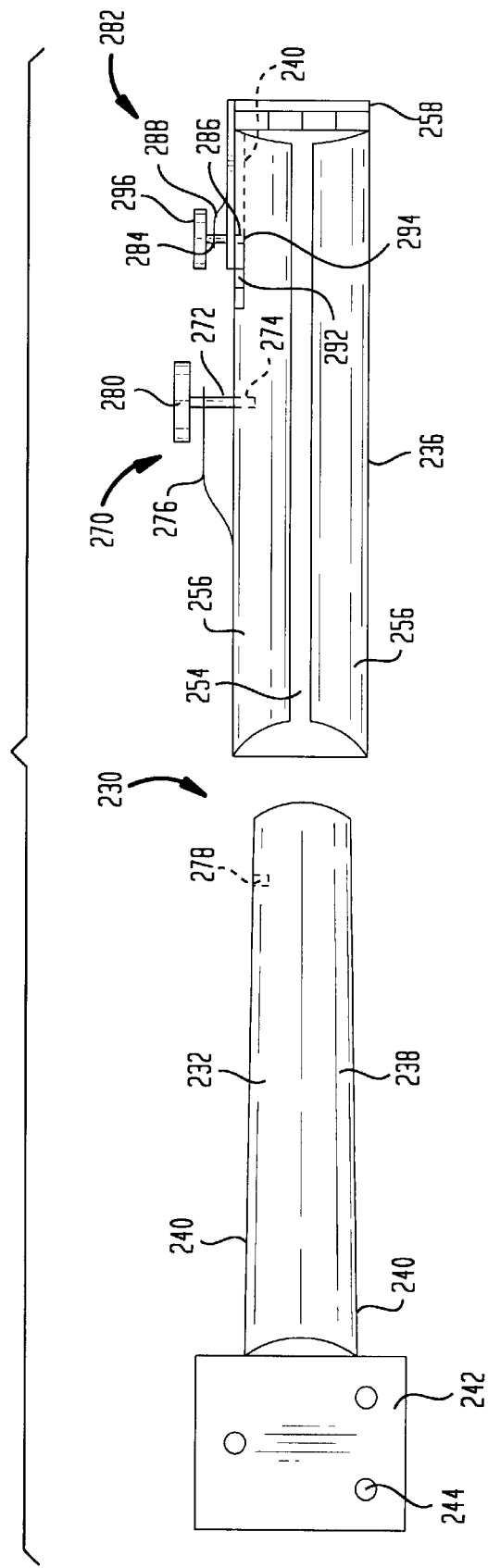

HINGED TRACKING SYSTEM

BACKGROUND OF THE INVENTION

1. Field of the Invention

The present invention relates to a hinged tracking system for attaching a door to a cabinet, and more particularly, to a hinged tracking system for a cabinet which encloses electronics used in the telecommunications industry.

2. Description of the Background Art

Various cabinet arrangements are known for enclosing electronics, for example, electronics used in the telecommunications industry, in a weather-tight manner. The known cabinets include a front door pivotally attached to the cabinet by a standard hinge. However, utilizing only a front door limits access to certain portions of the interior of the cabinet. Accordingly, because access to certain portions of the interior of the cabinet is limited, electronics within the cabinet cannot be as densely packed.

There is a need in the art for a cabinet which allows improved access to the interior of the cabinet through the front door. This would permit the interior of the cabinet to accommodate a more densely packed arrangement of electronics.

SUMMARY OF THE INVENTION

The present invention fulfills the aforementioned need in the art by providing a hinged tracking system for attaching a door to a cabinet which allows the door to translate rectilinearly away from the cabinet, as well as rotate with respect to the cabinet. The hinged tracking system includes a sliding portion having a track member attachable to the cabinet, and a slide member slidable relative to the first member. A pivoting portion including a hinge having a first member is attached to the slide member of the sliding portion, and a second member is attachable to the door. By utilizing the hinged tracking system, the door may be slid, without rotation, from a closed position to a spaced position away from the cabinet, and alternatively, the door may be rotated, without sliding, from said closed position to a rotated position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 7 is an exploded side view of a third embodiment of the hinged tracking system of the present invention; and FIG. 8 is a top view of a locking portion of the third embodiment of the hinged tracking system.

DETAILED DESCRIPTION OF THE PREFERRED EMBODIMENTS

Figure 1:
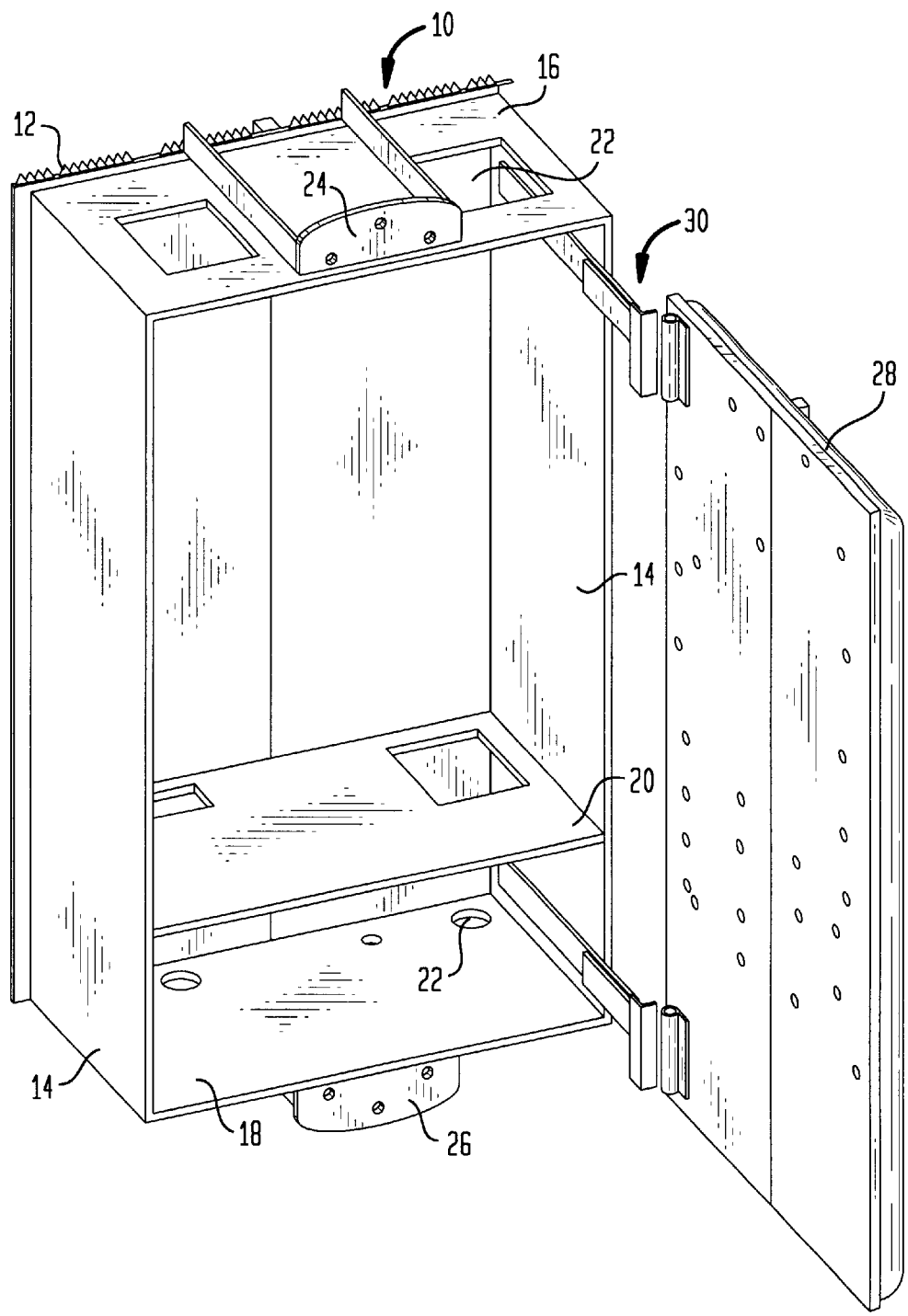
FIG. 1 is a left perspective view of a cabinet including the hinged tracking system of the present invention showing the door in a translated and rotated position.
Figure 2:
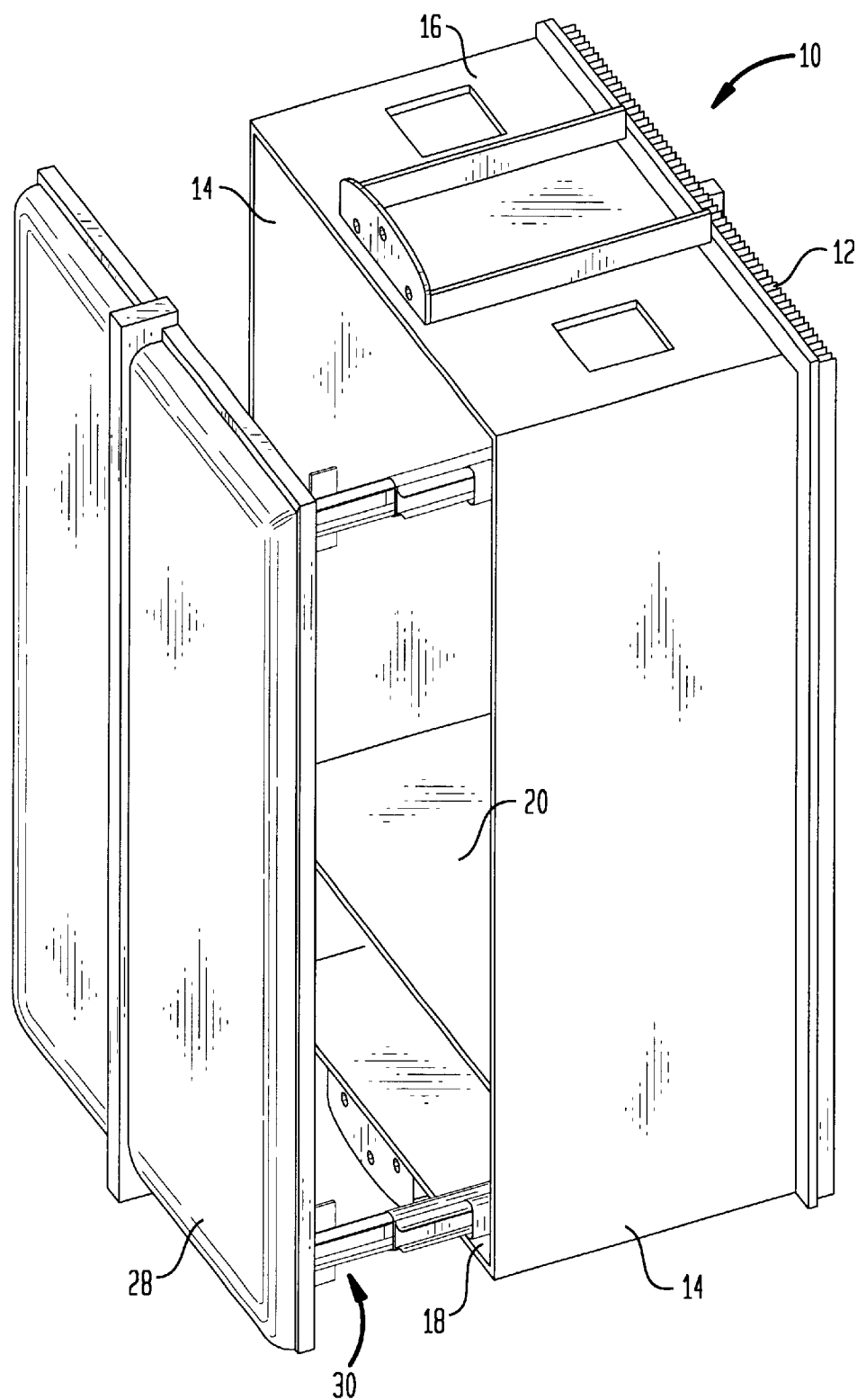
FIG. 2 is a right perspective view of the cabinet of FIG. 1 showing the door in a translated position only.

Referring in detail to the drawings, and with particular reference to FIGS. 1 and 2, a cabinet 10 is shown. The cabinet 10 is preferably used to enclose electronics, for example, electronics used in the telecommunications industry, in a weather-tight manner. The cabinet 10 includes a back wall 12, a pair of side walls 14, a top wall 16 and a bottom wall 18. One or more shelves 20 may be located within the cabinet 10. Apertures 22 may be located in any of the walls 12, 14, 16, 18 of the cabinet 10 for allowing conductors or the like to pass therethrough. An upper mounting bracket 24 is fixed to the top wall 16, and a lower mounting bracket 26 is fixed to the bottom wall 18 for fastening the cabinet 10 to a suitable structure (not shown) such as a building wall. The approximate dimensions of the cabinet 10 are 17 inches wide, 24 inches high, and 9 ¼ inches deep.

A door 28 is located on the front of the cabinet 10. The door 28 is attached to the cabinet 10 by a hinged tracking system 30. The hinged tracking system 30 allows the door 28 to translate rectilinearly away from the cabinet 10, as well as rotate with respect to the cabinet 10. Preferably, the door 28 translates at least 6 ¼ inches, and rotates 90 degrees, although any desired amount of translation and rotation may be utilized depending on the particular application of the cabinet 10. For example, it may be desirable to allow the door 28 to rotate 180 degrees.

Figure 3:
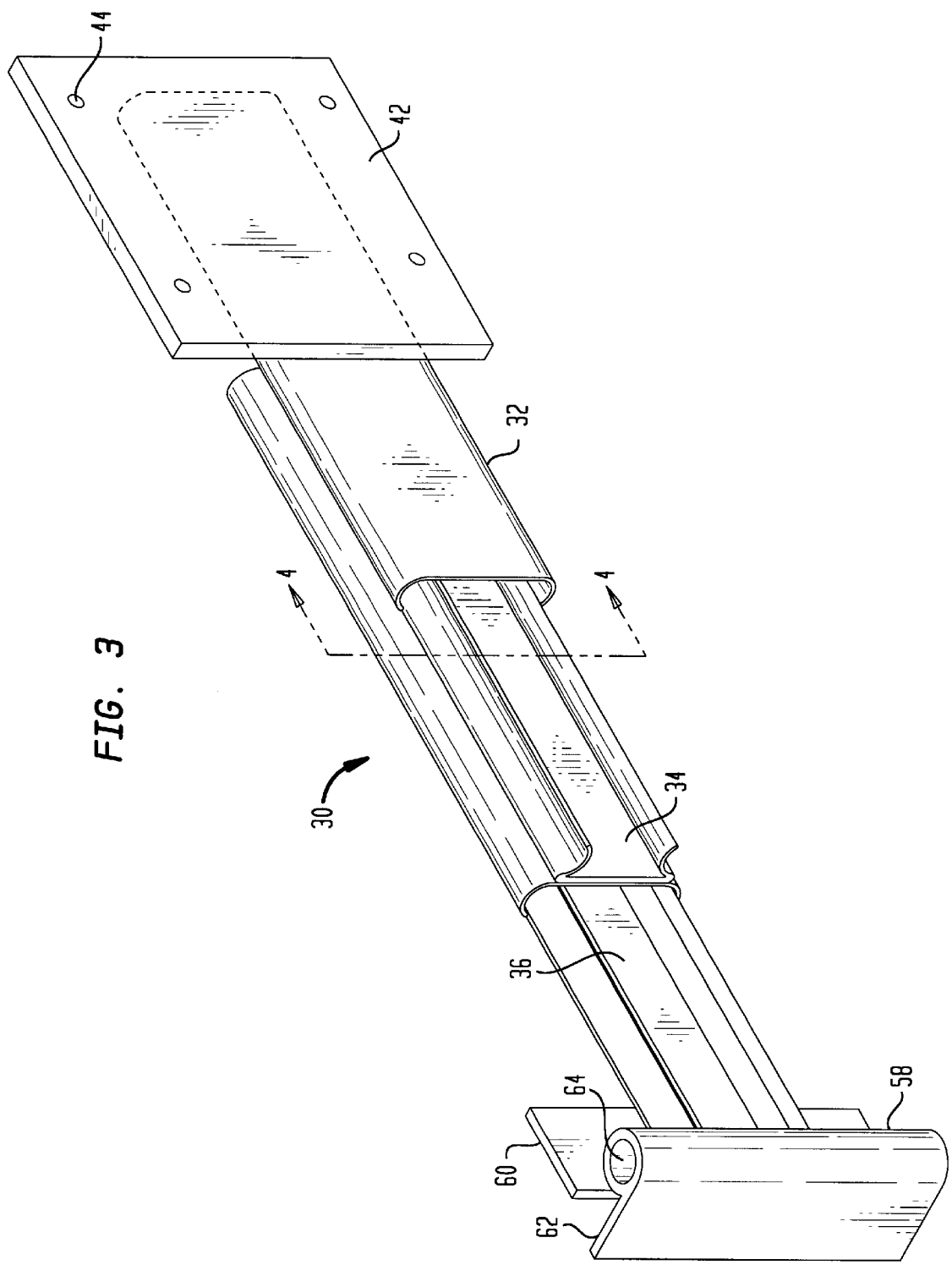
FIG. 3 is a perspective view of the hinged tracking system in an extended position.
Figure 4:
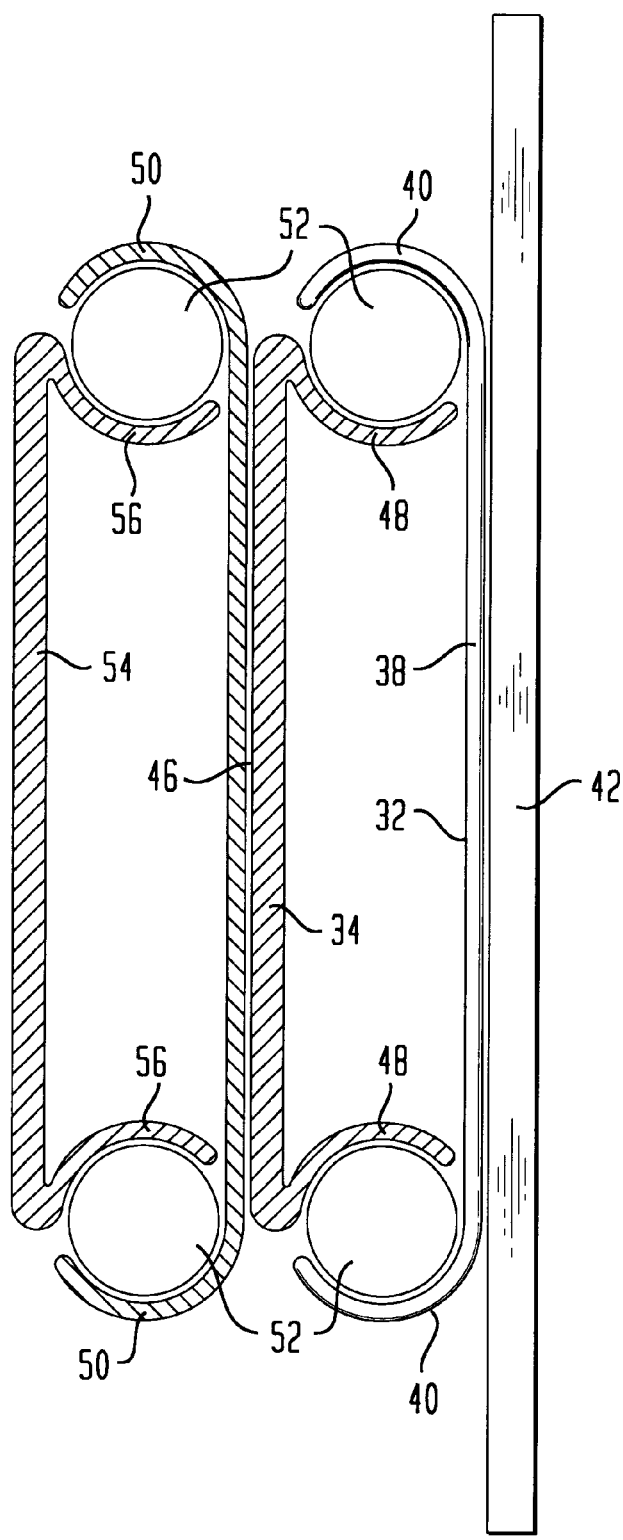
FIG. 4 is a cross-sectional view of the hinged tracking system taken along line 4—4 of FIG. 3.

Referring now to FIGS. 3 and 4, the hinged tracking system 30 includes a track member 32, an intermediate member 34, and a slide member 36. The intermediate member 34 is slidably received within the track member 32, and the slide member 36 is slidably received within the intermediate member 34.

The track member 32 includes a flat central portion 38 and a pair of opposing inwardly-curved edge portions 40. A mounting plate 42 may be attached to the flat portion 38 of the track member 32, preferably near one end thereof The mounting plate 42 contains a plurality of mounting holes 44 therein which receive fasteners (not shown) for attaching the track member 32 to the side wall 19 of the cabinet 10. Alternatively, the track member 32 may be directly attached to the side wall 14 of the cabinet 10 utilizing suitable fasteners, such as screws, rivets, or spot welds.

The intermediate member 34 includes a flat central portion 46, a pair of opposing outwardly-curved edge portions 48, and a pair of opposing inwardly-curved edge portions 50. The outwardly-curved edge portions 48 of the intermediate member 34 are positioned adjacent to the inwardly-curved edge portions 40 of the track member 32. A plurality of balls 52 are located between the outwardly-curved edge portions 48 of the intermediate member 34 and the inwardly-curved edge portions 40 of the track member 32 to allow the intermediate member 34 to roll along the track member 32 during extension and retraction of the intermediate member 34.

The slide member 36 includes a flat central portion 54, and a pair of opposing outwardly-curved edge portions 56.

The outwardly-curved edge portions 56 of the slide member 36 are positioned adjacent to the inwardly-curved edge portions 50 of the intermediate member 34. A plurality of balls 52 are located between the outwardly-curved edge portions 56 of the slide member 36 and the inwardly-curved edge portions 50 of the intermediate member 34 to allow the slide member 36 to roll along the intermediate member 34 during extension and retraction of the slide member 36.

It should be understood that although a rolling ball interface between the track member 32, the intermediate member 34, and the slide member 36 has been described in a preferred embodiment, other friction reducing interfaces may be utilized such as wheels, rollers, or low-friction glides. Alternatively, a sliding fit without friction-reducing elements may also be utilized.

Located at one end of the slide member 36 is a hinge 58. The hinge 58 has a fixed leaf 60 pivotally attached to a rotating leaf 62 by a pivot pin 64. The fixed leaf 60 is fixed to the flat portion 54 of the slide member 36 by any suitable fastening method, such as screws, rivets, or spot welds. The door 28 (see FIGS. 1 or 2) is attached to the rotating leaf 62 by any suitable fastening method, such as screws, rivets, or spot welds.

With the hinged tracking system 30 fixed between the door 28 and the cabinet 10, the door 28 may be moved linearly from the closed position to a spaced position, as shown in FIG. 2, and then pivoted from the spaced position to a spaced/rotated position, as shown in FIG. 1, whereby the cabinet 10 is open and the contents therein are easily accessible. Alternatively, the door 28 may be pivoted from the closed position to a rotated position, and then moved linearly from the rotated position to a spaced/rotated position shown in FIG. 1. Also, the door 28 may be moved in any combination of translation and rotation.

Figure 5:
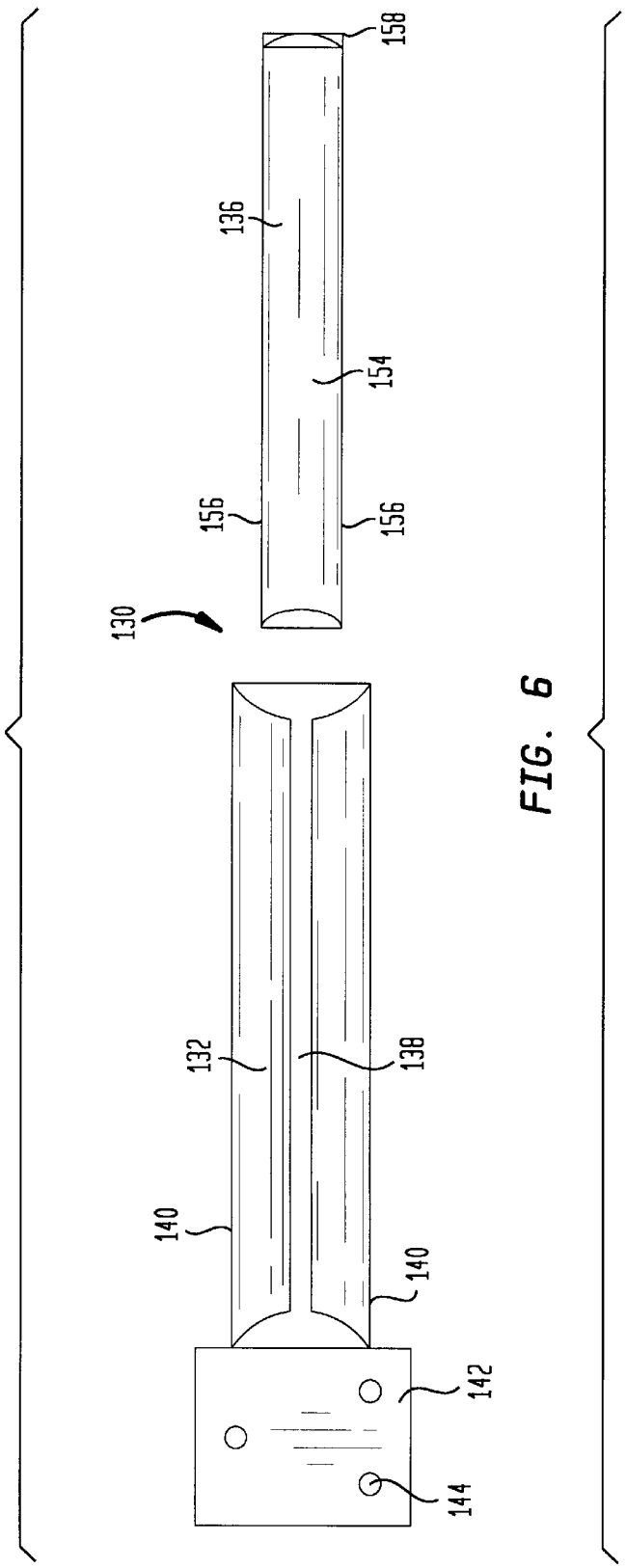
FIG. 5 is an exploded side view of a second embodiment of the hinged tracking system of the present invention.
Figure 6:
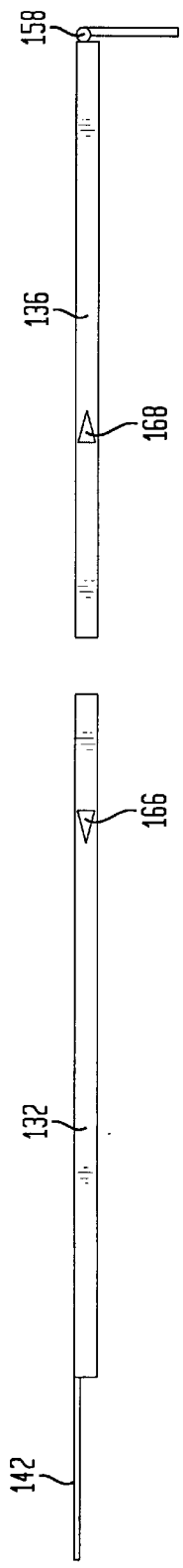
FIG. 6 is an exploded top view of the second embodiment of the hinged tracking system.

Referring now to FIGS. 5 and 6, a second embodiment of the hinged tracking system 130 is shown. The hinged tracking system 130 of the second embodiment does not include the intermediate member 34 as did the first embodiment. Instead, the second embodiment includes a track member 132 having a slide member 136 slidably mounted therein.

The track member 132 includes a flat central portion 138 and a pair of opposing side edge portions 140 which are curved around to form a hollow substantially tubular configuration. A mounting plate 142 having a plurality of mounting holes 144 therein is formed as an enlarged extension of one end of the flat central portion 138 of the track member 132 for attaching the track member 132 to the cabinet 10. Alternatively, the mounting plate 142 may be attached to the flat portion 138 of the track member 132, preferably near one end thereof, as described above with respect to the first embodiment.

The slide member 136 includes a flat central portion 154, and a pair of opposing side edge portions 156 which are curved around and flattened. The slide member 136 slides along the interior of the track member 132 during extension and retraction of the slide member 136.

The track member 132 and the slide member 136 each include stoppers which prevent overtravel of the slide member 136 with respect to the track member 132, so that the slide member 136 does not inadvertently slide completely out of the track member 132. A first stopper 166 is located interiorly of the tubular configuration of the track member 132 near one end thereof, preferably on the curved portion. A second stopper 168 is located on the exterior of the slide member 136 near one end thereof, preferably on the curved portion also. With the slide member 136 installed in the track member 132, when the slide member 136 is withdrawn from the track member 132, the first stopper 166 will engage the second stopper 168 and prevent further withdrawal of the slide member 136 from the track member 132.

A hinge 158 is located at one end of the slide member 136, in the manner described above with respect to the first embodiment. However, the hinge 158 in the second embodiment is somewhat shorter than the hinge 158 in the first embodiment.

The track member 132 is fixed to the cabinet 10, and the door 28 is attached to the hinge 158. Translational and rotational operation of the door 28 is the same as described above with respect to the first embodiment, except that the stoppers 166, 168 prevent overtravel of the slide member 136 with respect to the track member 132, so that the slide member 136 does not inadvertently slide completely out of the track member 132.

It should be understood that although an overtravel prevention arrangement has been described only with respect to the second embodiment, that a similar arrangement would preferably be included in the first embodiment to prevent the slide member 36 from being completely withdrawn from the intermediate member 34, and to prevent the intermediate member 34 from being completely withdrawn from the track member 32.

Referring now to FIGS. 7 and 8, a third embodiment of the hinged tracking system 230 is shown. The hinged tracking system 230 of the third embodiment does not include the intermediate member 34 as did the first embodiment Instead, the third embodiment includes a track member 232 and a slide member 236 as did the second embodiment However, unlike the second embodiment where the slide member 136 is sidably mounted within the track member 132, in the third embodiment, the slide member 236 is slidably mounted around the track member 232.

The track member 232 includes a flat central portion 238 and a pair of opposing side edge portions 240 which are curved around and flattened. A mounting plate 242 having a plurality of mounting holes 244 therein may be formed as an extension of the flat portion 238 of the track member 232, as described above with respect to the first and second embodiments, for attaching the track member 232 to the cabinet 10.

The slide member 236 includes a flat central portion 254, and a pair of opposing side edge portions 256 which are curved around to fonn a hollow substantially tubular configuration. The slide member 236 slides around the exterior of the track member 232 during extension and retraction of the slide member 236.

A hinge 258 is located at one end of the slide member 236, in the manner described above with respect to the second embodiment. The track member 232 is fixed to the cabinet 10, and the door 28 is attached to the hinge 258. Translational and rotational operation of the door 28 is the same as described above with respect to the first and second embodiments.

The slide member 236 includes a slide locking system 270 which allows the slide member 236 to be locked in a fully extended maximum position. The slide locking system 270 includes a slide locking pin 272 movably attached to the slide member 236. The slide locking pin 272 is movable within an aperture 274 in the curved portion of the slide member 236 between an engaged position and a disengaged position. A leaf spring 276 biases the slide locking pin 272 toward the engaged position.

A slide locking indentation 278 is provided in the curved portion of the track member 232 which defines the maximum allowable translation of the slide member 236. As the slide member 236 is extended, the end of the slide locking pin 272 slides along the surface of the curved portion of the track member 232 until the maximum allowable translation position is reached. At that time, the slide locking pin 272 become aligned with the slide locking indentation 278, and is moved thereinto by the biasing force provided by the leaf spring 276. A knob 280 is attached to the slide locking pin 272 which may be grasped by a user to move the slide locking pin 272 to a disengaged position against the biasing force provided by the leaf spring 276, and the slide member 236 may then be slid along the track member 232 to a retracted position. Alterative, with the slide locking pin 272 in a disengaged position, the door 28 may be completely removed from the cabinet 10 by sliding the slide member 236 completely off of the track member 232.

The slide member 236 further includes a hinge locking system 282 which allows the hinge 258 to be locked in a filly closed position or in a fully open position, which may be defined as a position rotated approximately 90 degrees from the closed position. The hinge locking system 282 includes a hinge locking pin 284 movably attached to the slide member 236. The hinge locking pin 284 is movable within an aperture 286 in the curved portion of the slide member 236 between an engaged position and a disengaged position. A leaf spring 288 biases the hinge locking pin 284 toward the engaged position.

A stop member 290 is pivotally mounted to the rotating leaf 262 of the hinge 258, and is slidably mounted within the slide member 236. As the rotating leaf 262 is rotated between the closed position and the open position, the stop member 290 slides back and forth along the slide member 236.

First and second hinge locking indentations 292, 294 are provided in the top portion of the stop member 290 which define the closed and the fully open positions of the hinge 258. As the rotating leaf 262 of the hinge 258 is rotated, the end of the hinge locking pin 284 slides along the surface of the top portion of the stop member 290 until the filly open position is reached. At that time, the hinge locking pin 284 become aligned with the first hinge locking indentation 292, and is moved thereinto by the biasing force provided by the leaf spring 288. A knob 296 is attached to the hinge locking pin 284 which may be grasped by a user to move the hinge locking pin 284 to a disengaged position against the biasing force provided by the leaf spring 288, and the rotating leaf 262 of the hinge 258 may then be rotated toward the closed position. Once in the closed position, the hinge locking pin 284 becomes aligned with the second hinge locking indentation 294, and is moved thereinto by the biasing force provided by the leaf spring 288.

While the locking systems 270, 282 of the present invention have been described with reference to a third embodiment, it should be understood that these locking systems 270, 282 can also be incorporated into the first and second embodiments.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An enclosure comprising:
   a weather-tight cabinet including a back wall, a top wall, a bottom wall, a pair of side walls, and a door forming a front wall; and
   a hinged tracking system for attaching said door to one of said side walls of said cabinet comprising:
      a sliding portion, said sliding portion having a track member attachable to the cabinet, and a slide member slidable relative to the track member; and
      a pivoting portion, said pivoting portion including a hinge pivotable about a vertical axis having a first member attached to the slide member of the sliding portion, and a second member attachable to the door,
   whereby the door is slidable, without rotation, from a closed position to an open spaced position away from the cabinet, and the door is rotatable about said vertical axis, without sliding, from said closed position to an open rotated position,
   wherein said track member is attached to a surface of said one of said side walls, said surface defining a vertical plane, said vertical axis of rotation of said door extending parallel to said vertical plane.

2. The enclosure as set forth in claim 1, further comprising an intermediate member located between said track member and said slide member.

3. The enclosure as set forth in claim 2, wherein said track member includes a flat central portion and a pair of opposing inwardly-curved edge portions, and said intermediate member includes a flat central portion and a pair of opposing outwardly-curved edge portions, the outwardly-curved edge portions of the intermediate member being positioned adjacent to the inwardly-curved edge portions of the track member.

4. The enclosure as set forth in claim 3, further comprising a plurality of balls located between the outwardly-curved edge portions of the intermediate member and the inwardly-curved edge portions of the track member for allowing the intermediate member to roll along the track member during extension and retraction of the intermediate member.

5. The enclosure as set forth in claim 2, wherein the intermediate member includes a flat central portion and a pair of opposing inwardly-curved edge portions, and the slide member includes a flat central portion and a pair of opposing outwardly-curved edge portions, the outwardly-curved edge portions of the slide member being positioned adjacent to the inwardly-curved edge portions of the intermediate member.

6. The enclosure as set forth in claim 5, further comprising a plurality of balls located between the outwardly-curved edge portions of the slide member and the inwardly-curved edge portions of the intermediate member for allowing the slide member to roll along the intermediate member during extension and retraction of the slide member.

7. The enclosure as set forth in claim 1, wherein said track member includes a flat central portion, and said hinged tracking system further comprises a mounting plate attached to the flat portion of the track member for attaching the track member to a side wall of the cabinet.

8. The enclosure as set forth in claim 1, wherein said track member includes a flat central portion and a pair of opposing inwardly-curved edge portions, and said slide member includes a flat central portion and a pair of opposing outwardly-curved edge portions, the outwardly-curved edge portions of the slide member being positioned adjacent to the inwardly-curved edge portions of the track member.

9. The enclosure as set forth in claim 8, further comprising a plurality of balls located between the outwardly-curved edge portions of the slide member and the inwardly-curved edge portions of the track member for allowing the slide member to roll along the track member during extension and retraction of the slide member.

10. The enclosure as set forth in claim 1, wherein the track member includes a flat central portion and a pair of opposing side edge portions which are curved around to form a hollow substantially tubular configuration, the slide member includes a flat central portion and a pair of opposing side edge portions which are curved around and flattened, and the slide member slides along an interior of the track member during extension and retraction of the slide member.

11. The enclosure as set forth in claim 10, wherein the track member includes a first stopper, and the slide member includes a second stopper, the first stopper engaging the second stopper when the slide member is withdrawn from the track member to prevent further withdrawal of the slide member from the track member.

12. The enclosure as set forth in claim 11, wherein the first stopper is located interiorly of the tubular configuration of the track member near one end thereof, and the second stopper is located on an exterior of the slide member near one end thereof.

13. The enclosure as set forth in claim 1, further comprising a slide locking system including:
   a slide locking pin movably attached to the slide member and movable between an engaged position and a disengaged position;
   a leaf spring for biasing the slide locking pin toward the engaged position; and
   a slide locking indentation provided in the track member, wherein said slide locking pin is movable into said slide locking indentation in said engaged position.

14. The enclosure as set forth in claim 13, further comprising a knob attached to the slide locking pin actuatable by a user to move the slide locking pin to a disengaged position against the biasing force provided by the leaf spring.

15. The enclosure as set forth in claim 1, further comprising a hinge locking system comprising:
   a hinge locking pin movably attached to the slide member and movable between an engaged position and a disengaged position;
   a leaf spring for biasing the hinge locking pin toward the engaged position;
   a stop member pivotally mounted to the second member of the hinge and sidably mounted within the slide member; and
   at least one hinge locking indentation provided in the stop member,
      wherein said hinge locking pin is movable into said at least one hinge locking indentation in said engaged position.

16. The enclosure as set forth in claim 15, further comprising a knob attached to the hinge locking pin actuatable by a user to move the hinge locking pin to a disengaged position against the biasing force provided by the leaf spring.

17. An enclosure comprising:
   a weather-tight cabinet including a back wall, a top wall, a bottom wall, a pair of side walls, and a door forming a front wall; and
   a hinged tracking system including a pair of spaced-apart hinged tracking members each attached to a same one of said side walls, each of said hinged tracking members including:
      a sliding portion, said sliding portion having a track member attached to said one of said side walls of said cabinet, and a slide member slidable relative to the track member; and
      a pivoting portion, said pivoting portion including a hinge having a first member attached to said slide member of said sliding portion, and a second member attached to said door,
      whereby said door is slidable, without rotation, from a closed position to an open spaced position away from said cabinet, and said door is rotatable about a vertical axis, without sliding, from said closed position to an open rotated position.

18. The enclosure as set forth in claim 17, further comprising an intermediate member located between said track member and said slide member.

19. The enclosure as set forth in claim 18, wherein said track member includes a flat central portion and a pair of opposing inwardly-curved edge portions, and said intermediate member includes a flat central portion and a pair of opposing outwardly-curved edge portions, the outwardly-curved edge portions of the intermediate member being positioned adjacent to the inwardly-curved edge portions of the track member.

20. The enclosure as set forth in claim 19, wherein the intermediate member further includes a pair of opposing inwardly-curved edge portions, and the slide member includes a flat central portion and a pair of opposing outwardly-curved edge portions, the outwardly-curved edge portions of the slide member being positioned adjacent to the inwardly-curved edge portions of the intermediate member.

21. The enclosure as set forth in claim 17, wherein said door is rotatable 180° about said vertical axis from said closed position to said open rotated position.

22. The enclosure as set forth in claim 17, wherein said track member is attached to a surface of said same one of said side walls, said surface defining a vertical plane, said vertical axis of rotation of said door extending parallel to said vertical plane.

23. An enclosure comprising:
   a weather-tight cabinet including a back wall, a top wall, a bottom wall, a pair of side walls, and a door forming a front wall; and
   a hinged tracking system for attaching said door to one of said side walls of said cabinet comprising:
      a sliding portion, said sliding portion having a track member attachable to the cabinet, and a slide member slidable relative to the track member; and
   a pivoting portion, said pivoting portion including a hinge pivotable about a vertical axis having a first member attached to the slide member of the sliding portion, and a second member attachable to the door,
   whereby the door is slidable, without rotation, from a closed position to an open spaced position away from the cabinet, and the door is rotatable about said vertical axis, without sliding, from said closed position to an open rotated position,
   wherein said door is rotatable 180° about said vertical axis from said closed position to said open rotated position.

* * * * *